US010037196B2

(12) United States Patent
McPherson et al.

(10) Patent No.: US 10,037,196 B2
(45) Date of Patent: Jul. 31, 2018

(54) SOURCE TO IMAGE FRAMEWORK FOR A PLATFORM-AS-A-SERVICE SYSTEM

(71) Applicant: Red Hat, Inc., Raleigh, NC (US)

(72) Inventors: Daniel McPherson, Raleigh, NC (US); Ben Parees, Raleigh, NC (US); Paul Morie, Georgetown, SC (US); Clayton Coleman, Raleigh, NC (US); Andrew Goldstein, Rockville, MD (US); Krishna Raman, Union City, CA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 14/606,311

(22) Filed: Jan. 27, 2015

(65) Prior Publication Data

US 2016/0216948 A1    Jul. 28, 2016

(51) Int. Cl.
*G06F 9/44* (2018.01)
*G06F 8/36* (2018.01)
*G06F 8/71* (2018.01)

(52) U.S. Cl.
CPC . *G06F 8/36* (2013.01); *G06F 8/71* (2013.01)

(58) Field of Classification Search
CPC .................................... G06F 8/36; G06F 8/70
USPC ........................................................ 717/106
See application file for complete search history.

(56) References Cited

U.S. PATENT DOCUMENTS

| 6,968,541 | B1 * | 11/2005 | Hanson et al. ............... 717/136 |
| 7,434,213 | B1 * | 10/2008 | Prakash et al. ............... 717/152 |
| 8,635,351 | B2 * | 1/2014 | Astete et al. ................ 709/229 |
| 8,671,404 | B2 * | 3/2014 | DeHaan et al. ................ 718/1 |
| 8,819,672 | B2 * | 8/2014 | Joukov et al. ............... 717/177 |
| 8,850,514 | B2 * | 9/2014 | McGrath et al. ................ 726/1 |
| 9,009,663 | B2 * | 4/2015 | Kunze ........................... 717/120 |
| 9,116,767 | B1 * | 8/2015 | Arif et al. |
| 9,116,768 | B1 * | 8/2015 | Sawhney et al. |
| 9,122,562 | B1 * | 9/2015 | Stickle |
| 2004/0194082 | A1 * | 9/2004 | Purkeypile ............... G06F 8/71 717/174 |
| 2011/0055310 | A1 * | 3/2011 | Shavlik et al. ............... 709/202 |
| 2011/0295984 | A1 * | 12/2011 | Kunze ........................... 709/220 |
| 2011/0302415 | A1 * | 12/2011 | Ahmad et al. ................ 713/168 |
| 2012/0096165 | A1 * | 4/2012 | Madduri et al. ............. 709/226 |
| 2013/0198717 | A1 | 8/2013 | Igelka |

(Continued)

OTHER PUBLICATIONS

Tezer, How to Install and Use Docker: Getting Started, DigitalOcean (Dec. 11, 2013) retrieved from https://www.digitalocean.com/community/tutorials/how-to-install-and-use-docker-getting-started on Jan. 11, 2016.*

(Continued)

*Primary Examiner* — Lewis A Bullock, Jr.
*Assistant Examiner* — Theodore Hebert
(74) *Attorney, Agent, or Firm* — Lowenstein Sandler LLP

(57) ABSTRACT

Implementations provide for a source to image framework for a Platform-as-a-Service (PaaS) system. A method of the disclosure includes invoking source-to-image (STI) orchestration logic to perform a build for an application of a multi-tenant PaaS system, launching a build container for the build in view of a base image of the application, the base image providing a core functionality for the application, accessing source code of the application at the build container, assembling an application image using the base image and the source code, and committing the application image to a repository.

20 Claims, 7 Drawing Sheets

(56) References Cited

U.S. PATENT DOCUMENTS

| | | | |
|---|---|---|---|
| 2013/0227560 A1* | 8/2013 | McGrath et al. | 718/1 |
| 2013/0227563 A1* | 8/2013 | McGrath | 718/1 |
| 2013/0297673 A1* | 11/2013 | McGrath et al. | 709/203 |
| 2013/0297685 A1* | 11/2013 | McGrath et al. | 709/204 |
| 2013/0297795 A1* | 11/2013 | McGrath et al. | 709/226 |
| 2013/0298183 A1* | 11/2013 | McGrath et al. | 726/1 |
| 2013/0326503 A1* | 12/2013 | De et al. | 718/1 |
| 2014/0282372 A1* | 9/2014 | Araya et al. | 717/106 |
| 2015/0304450 A1* | 10/2015 | van Bemmel | |

OTHER PUBLICATIONS

Gasienica, Docker-node-hello, GitHub.com (Jun. 1, 2013) retrieved from https://github.com/enokd/docker-node-hello/commit/15065c4d730e60ee803932d81c4aad264eae0e6d.*

Coleman, C. et al., "OpenShift PEP 010: Cartridge V3 and Docker Containers", http://openshift.github.io/documentation/openshift-pep-010-docker-cartridges.html, Jan. 29, 2015, 26 pages.

Hicks, Matt, "GearD: The Intersection of PaaS, Docker and Project Atomic", https://blog.openshift.com/geard-the-intersection-of-paas-docker-and-project-atomic/, Apr. 15, 2014, 10 pages.

Warden, Christian G., "Building Multi-Container Apps with Pananriax", http://xn.pinkhamster.net/blog/tech/building-multi-container-apps-with-panamax.html, Sep. 8, 2014, 7 pages.

Barrett, Mike, "OpenShift Enterprise: Meeting Tomorrow's Expectations Today", http://people.redhat.com/mskinner/rhug/q2.2014/openshift.pdf, [retreived from the internet on Jan. 29, 2015], 53 pages.

Bergknoff, Jonathan, "Building Good Docker Images", http://jonathan.bergknoff.com/journal/building-good-docker-images, Oct. 3, 2014, 7 pages.

* cited by examiner

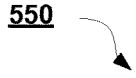

550

```
Access prior build application image
                                                555
```

```
Generate new container from prior build application image, where the new
              container includes an archive file
                                                560
```

```
Execute save artifacts script to copy identified build artifacts into archive file
                                                565
```

```
Stream archive file to stdout
                                                570
```

```
Extract and utilize the saved artifacts from the archive file streamed to stdout in
              subsequent builds of the application image
                                                575
```

*Figure 5B*

SOURCE TO IMAGE FRAMEWORK FOR A PLATFORM-AS-A-SERVICE SYSTEM

TECHNICAL FIELD

The implementations of the disclosure relate generally to Platform-as-a-Service (PaaS) systems and, more specifically, relate to a source to image framework for a PaaS system.

BACKGROUND

A variety of Platform-as-a-Service (PaaS) system offerings exists that include software and/or hardware facilities for facilitating the execution of web applications in a cloud computing environment (the "cloud"). Cloud computing is a computing paradigm in which a customer pays a "cloud provider" to execute a program on computer hardware owned and/or controlled by the cloud provider. It is common for cloud providers to make virtual machines (VMs) hosted on their computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicate with the executing program from remote geographic locations using Internet protocols.

PaaS offerings facilitate deployment of web applications without the cost and complexity of buying and managing the underlying hardware and software and provisioning hosting capabilities, providing the facilities to support the complete life cycle of building and delivering web applications and services entirely available from the Internet. Typically, these facilities operate as one or more VMs running on top of a hypervisor in a host server.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIGS. 5A and 5B are flow diagrams illustrating methods for utilizing an STI framework to save artifacts of an executable application image in a PaaS system according to implementations of the disclosure.

DETAILED DESCRIPTION

Implementations of the disclosure provide for a source to image (STI) framework for a Platform-as-a-Service (PaaS) system. Implementations provide an STI component that is implemented as part of a PaaS system. The STI component can be implemented on all nodes of the PaaS system or, alternatively, on a subset of the nodes of the PaaS system. In one implementation, the STI component provides a logic framework to produce ready-to-run images for applications of the PaaS system. An image refers to data representing executables and files of an application used to deploy functionality for a runtime instance of the application. The STI component simplifies the process for creating a usable runtime image for the application in the PaaS system. The STI component injects user-provided source code for an application into a base image providing core functionality for the application in order to assemble a ready-to-use image for running the application on the PaaS system. Furthermore, the STI component of implementations supports incremental builds of application images by re-using artifacts generated from previous builds of an application (e.g., downloaded dependencies, previously-built artifacts, etc.).

Previous solutions generally have not provided a source-to-image framework for a multi-tenant PaaS environment. Current source-to-image solutions typically do not offer a unique user space solution or adequate security environment to be usable in a multi-tenant PaaS system. Implementations of the disclosure provide an STI framework usable in a multi-tenant environment by introducing STI logic and scripts to the multi-tenant PaaS system that allow for base images to be combined with source code for an application to produce executable application images for the multi-tenant PaaS, thereby streamlining the build and deployment process for an end user of the multi-tenant PaaS.

Figure 1:
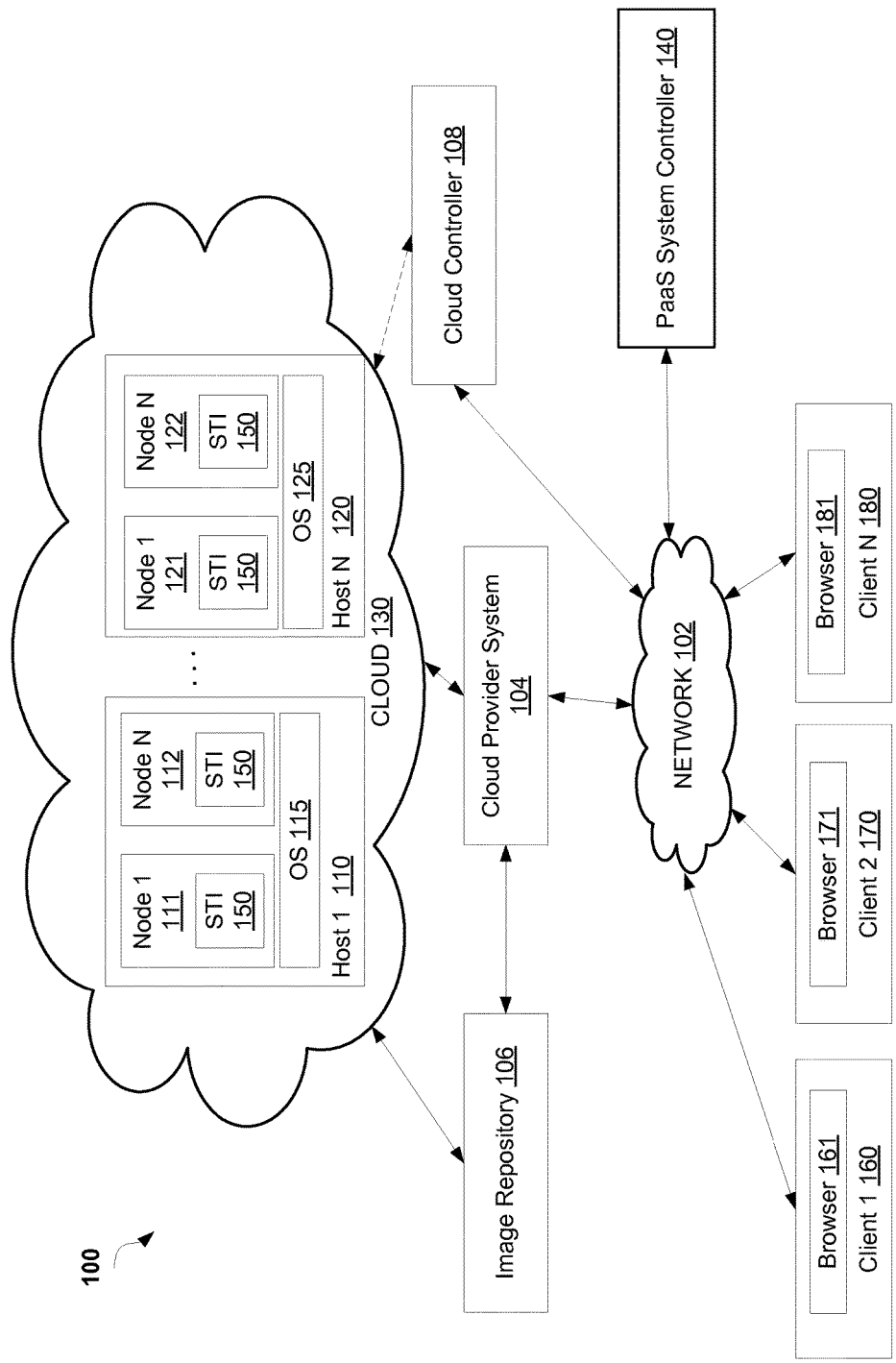
FIG. 1 is a block diagram of a network architecture in which implementations of the disclosure may operate.

FIG. 1 is a block diagram of a network architecture 100 in which implementations of the disclosure may operate. The network architecture 100 includes a cloud 130 managed by a cloud provider system 104. The cloud provider system 104 provides nodes 111, 112, 121, 122 to execute software and/or other processes. In some implementations these nodes are virtual machines (VMs) that are hosted on a physical machine, such as host 1 110 through host 120, configured as part of the cloud 130. In some implementations, the host machines 110, 120 are often located in a data center. For example, nodes 111 and 112 are hosted on physical machine 110 in cloud 130 provided by cloud provider 104. When nodes 111, 112, 121, 122 are implemented as VMs, they may be executed by OSes 115, 125 on each host machine 110, 120. Users can interact with applications executing on the cloud-based nodes 111, 112, 121, 122 using client computer systems, such as clients 160, 170 and 180, via corresponding web browser applications 161, 171 and 181.

In some implementations, the host machines 110, 120 are often located in a data center. In other implementations, the applications may be hosted directly on hosts 1 through 110-120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS system controller 140. Based on these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each VM 111, 112, 121, 122. This data may be used for the execution of applications for a multi-tenant PaaS system managed by the PaaS provider controller 140.

Upon receiving a command identifying specific data (e.g., application data and files used to initialize an application on the cloud), the cloud provider 104 retrieves the corresponding data from the image repository 106, creates an instance of it, and loads it to the host 110, 120 to run on nodes 111, 112, 121, 122. In addition, a command may identify specific data to be executed on one or more of the nodes 111, 112, 121, and 122. The command may be received from the cloud controller 108, from the PaaS system controller 140, or a user (e.g., a system administrator) via a console computer or a client machine. The image repository 106 may be local or remote and may represent a single data structure or multiple data structures (databases, repositories, files, etc.) residing on one or more mass storage devices, such as magnetic or optical storage based discs, solid-state-drives (SSDs) or hard drives.

In one implementation, nodes 111, 112, 121, 122 include a source to image (STI) component 150. The STI component 150 can be implemented on each of the nodes 111, 112, 121, 122 of the PaaS system or, alternatively, on a subset of the nodes 111, 112, 121, 122. In one implementation, the STI component 150 provides a logic framework to produce ready-to-run application images for applications of the PaaS system. An image refers to data representing executables and files of an application used to deploy functionality for a runtime instance of the application. The STI component 150 simplifies the process for creating a usable runtime image for the application in the PaaS system. The STI component injects user-provided source code for an application into a base image providing core functionality for the application (e.g., base framework used by the application) in order to assemble an application image (i.e., base image+source code) for running the application on the PaaS system. Further details of STI component 150 and its related workflows can be found below with respect to FIG. 2 through 5.

While various implementations are described in terms of the environment described above, those skilled in the art will appreciate that the facility may be implemented in a variety of other environments including a single, monolithic computer system, as well as various other combinations of computer systems or similar devices connected in various ways. For example, the data from the image repository 106 may run directly on a physical host 110, 120 instead of being instantiated on nodes 111, 112, 121, 122. In some implementations, an environment other than a VM may be used to execute functionality of PaaS applications. As such, in some implementations, a "node" providing computing functionality may provide the execution environment for an application of the PaaS system. The "node" may refer to a VM or any other type of computing environment.

Figure 2:
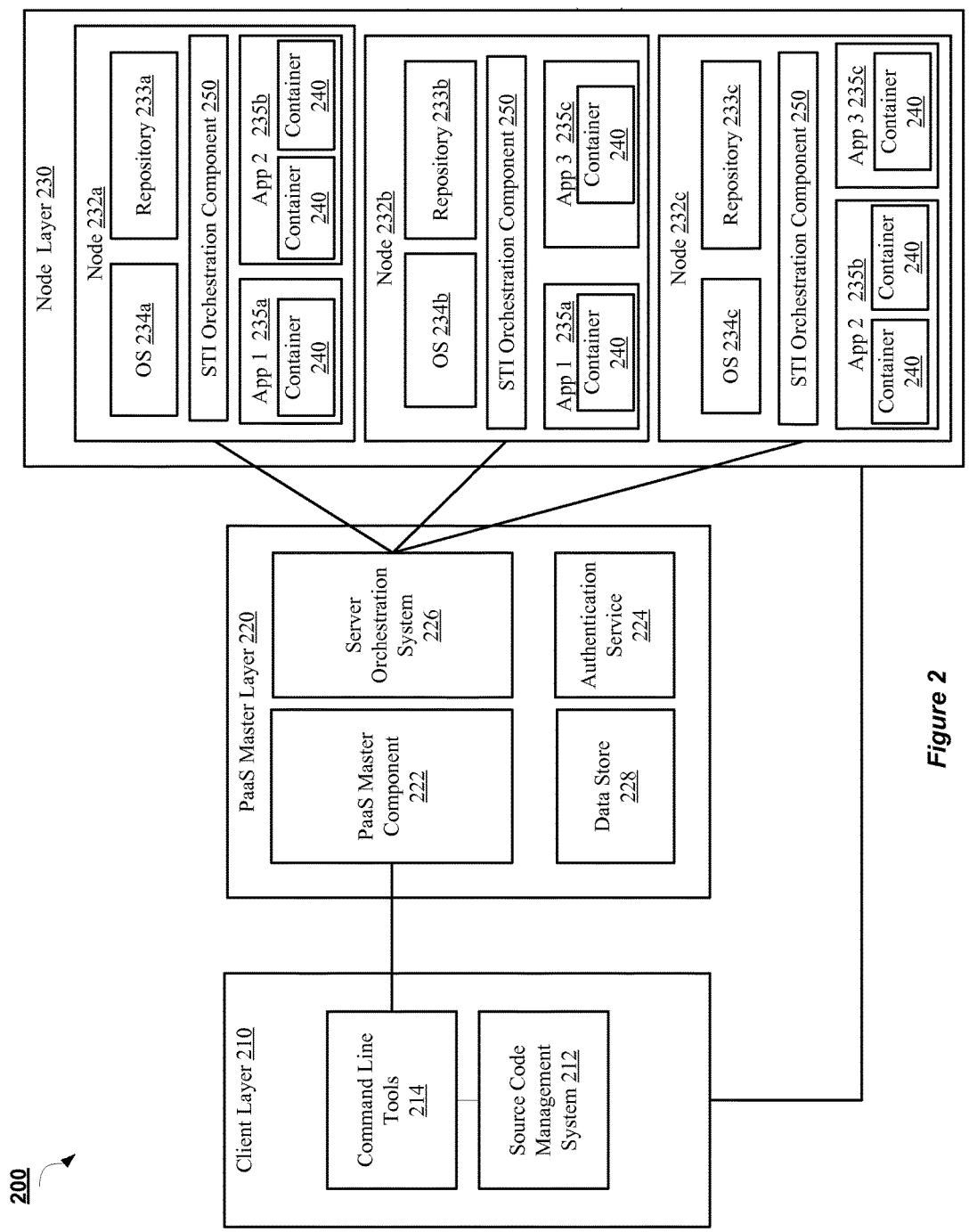
FIG. 2 is a block diagram of a multi-tenant Platform-as-a-Service (PaaS) system architecture according to an implementation of the disclosure.

FIG. 2 is a block diagram of a multi-tenant PaaS system architecture 200 according to an implementation of the disclosure. The PaaS architecture 200 allows users to launch software applications in a cloud computing environment, such as cloud computing environment provided in network architecture 100 described with respect to FIG. 1. The PaaS system architecture 200, in one implementation, includes a client layer 210, a PaaS master layer 220, and a node layer 230.

In one implementation, the components of the PaaS system architecture are in communication with each other via a network (not shown). The network may include, for example, the Internet in one implementation. In other implementations, other networks, wired and wireless, such as an intranet, local area network (LAN), wide area network (WAN), or broadcast network may be used.

In one implementation, the client layer 210 resides on a client machine, such as a workstation of a software developer, and provides an interface to a user of the client machine to the PaaS master layer 220 of the PaaS system 200. In one implementation, the client machine can be a client 160, 170, 180 described with respect to FIG. 1. The PaaS master layer 220 may facilitate the creation and deployment on the cloud (via node layer 230) of software applications being developed by an end user at client layer 210.

In one implementation, the client layer 210 includes a source code management system 212, sometimes referred to as "SCM" or revision control system. One example of such an SCM or revision control system is Git, available as open source software. Git and other such distributed SCM systems typically include a working directory for making changes, and a local software repository for storing the changes for each application associated with the end user of the PaaS system 200. The packaged software application can then be "pushed" from the local SCM repository to a remote SCM repository, such as repositories 233a, 233b, 233c, at the node(s) 232a, 232b, 232c running the associated application. From the remote SCM repository 233a, 233b, 233c, the code may be edited by others with access, or the application may be executed by a machine. Other SCM systems work in a similar manner.

The client layer 210, in one implementation, also includes a set of command line tools 214 that a user can utilize to create, launch, and manage applications. In one implementation, the command line tools 214 can be downloaded and installed on the user's client machine, and can be accessed via a command line interface or a graphical user interface, or some other type of interface. In one implementation, the command line tools 214 expose an application programming interface ("API") of the PaaS master layer 220 and perform other applications management tasks in an automated fashion using other interfaces, as will be described in more detail further below in accordance with some implementations.

In one implementation, the PaaS master layer 220 acts as middleware between the client layer 210 and the node layer 230. The node layer 230 includes the nodes 232a-c on which applications 235a-b are provisioned and executed. In one implementation, each node 232a-c is a VM. In some implementations, the VMs are provisioned by an Infrastructure as a Service (IaaS) provider. In other implementations, the nodes 232a-c may be physical machines or VMs residing on a single physical machine. In one implementation, the PaaS master layer 220 is implemented on one or more machines, such as server computers, desktop computers, etc. In some implementations, the PaaS master layer 220 may be implemented on one or more machines separate from machines implementing each of the client layer 210 and the node layer 230, or may be implemented together with the client layer 210 and/or the node layer 230 on one or more machines, or some combination of the above.

In one implementation, the PaaS master layer 220 includes a PaaS master component 222 that coordinates requests from the client layer 210 with actions to be performed at the node layer 230. Examples of the requests can include a request to create an application, a request to perform an action on a container (e.g., creating, removing, and/or managing a container), a request to deploy source code of an application, a request to designate a system to host a remote SCM repository (e.g., an indication that a system has been designated by a user to host a remote SCM repository), etc.

In one implementation, a user, using the command line tools 214 at client layer 210, can request the creation of a new application 235a-b, deployment of source code of the application 235a-b, the designation of a system that hosts a remote SCM repository, etc. In response to receiving such a request, the PaaS master component 222 may first authenticate the user using an authentication service 224. In one implementation, the authentication service 224 may comprise custom authentication methods, or standard protocols such as SAML, Oauth, etc. Once the user has been authenticated and allowed access to the system by authentication service 224, the PaaS master component 222 uses a server orchestration system 226 to collect information and configuration information about the nodes 232a-c.

The server orchestration system 226, in one implementation, functions to coordinate server-client interaction between multiple (sometimes a large number of) servers. In one implementation, the servers being orchestrated are nodes 232a-c, which are acting as application servers and web servers.

In one implementation, the PaaS master component 222 manages the business logic and model representing the nodes 232a-c and the applications 235a-b residing on the nodes, and acts as a controller that generates the actions requested by users via an API of the command line tools 214. The server orchestration system 226 then takes the actions generated by the PaaS master component 222 and orchestrates their execution on the many nodes 232a-c managed by the system.

In one implementation, the information collected about the nodes 232a-c can be stored in a data store 228. In one implementation, the data store 228 can be a locally-hosted database or file store, or it can be a cloud-based storage service provided by a Software-as-a-Service (SaaS) provider. The PaaS master component 222 uses the information about the nodes 232a-c and their applications 235a-b to model the application hosting service and to maintain records about the nodes. In one implementation, data of a node 232a-c is stored in the form of a JavaScript™ Object Notation (JSON) blob or string that maintains key-value pairs to associate a unique identifier, a hostname, a list of applications, and other such attributes with the node.

In implementations of the disclosure, the PaaS system architecture 200 of FIG. 2 is a multi-tenant PaaS environment. In a multi-tenant PaaS environment, each node 232a-c runs multiple applications 235a-b that may be owned or managed by different users and/or organizations. As such, a first customer's deployed applications 235a-b may co-exist with any other customer's deployed applications on the same node 232 that is hosting the first customer's deployed applications 235a-b. In some implementations, portions of an application execute on multiple different nodes 232a-c. For example, as shown in FIG. 2, components of application 1 235a run in both node 232a and node 232b. Similarly, components of application 2 235b may run in node 232b and node 232c.

In one implementation, each node 232a-c is implemented as a VM and has an operating system 234a-c that can execute applications 235a-c using the repositories 233a-c that are resident on the nodes 232a-c. Each node 232a-c also includes a server orchestration system agent (not shown) configured to track and collect information about the node 232a-c and to perform management actions on the node 232a-c. The server orchestration system agent may operate in tandem with the server orchestration system 226 to send requests, queries, and commands between the node 232a-c and the PaaS master layer 220.

In one implementation, each node 232a-c may include an STI orchestration component 250. The STI orchestration component may be the same as STI component 150 described with respect to FIG. 1. In one implementation, the STI orchestration component 250 provides a logic framework to produce ready-to-run application images for applications 235a-c of the PaaS system. Each application image may map to a functional component of the application 235a-c. As such, an application may have more than one application image associated with the application. The application images include support software providing functionality (e.g., configuration templates, scripts, dependencies, etc.) used to run the application 235a-c and/or add a feature to the application 235a-c. For example, the images may support languages such as, but not limited to, Java™, PHP, Ruby, Python, Perl, and so on. In addition, application images may be generated that support databases, such as MySQL™, PostgreSQL™, Mongo™, and others. Application images may also be generated that support build and continuous integration environments, such as a Jenkins-based image. Lastly, application images may be generated to support management capabilities and/or tools, such as PHPmyadmin, RockMongo™, 10gen-mms-agent, cron scheduler, HAProxy, Maven, and Gradle for example.

The STI component 150 can be implemented on each of the nodes 111, 112, 121, 122 of the PaaS system or, alternatively, on a subset of the nodes 111, 112, 121, 122. In some implementations, a separate node 232a-c may be provided that is dedicated to implementing STI orchestration for all nodes 232a-c and applications 235a-c of the PaaS system 200.

The STI component 250 simplifies the process for creating a usable runtime image for the application in the PaaS system 200. The STI component 250 injects a user-provided source code for an application into a base image providing core functionality for the application in order to assemble a ready-to-use application image for runtime of the application on the PaaS system. Further details of the application image build and deployment process are described below with respect to FIG. 3. Once STI component 250 builds an application image according to implementations of the disclosure, the application image may be committed to a repository, such as repository 233a-c or to a remote repository (not shown) outside of nodes 232a-c. The committed application image may then be used to subsequently launch the application 235a-c.

As discussed above, the application images include the underlying support software that implements the functionality of applications 235a-c. In one implementation, an application 235a-c may utilize one or more resource-constrained containers 240 on nodes 232a-c using instances of application image. A container 240 is a resource-constrained process space on the node 232a-c to execute functionality of an application 235a-c. In some implementations, a container 240 is established by the node 232a-c with resource boundaries, including a limit and/or designation of the amount of memory, amount of storage, and security types and/or labels to be applied to any functions executed by the container 240. In one implementation, containers 240 may be established using the Linux Containers (LXC) virtualization method. In further implementations, containers 240 may also be established using cgroups, SELinux™, and kernel namespaces, to name a few examples. In some implementations, STI component 250 is implemented as a separate container 240 on nodes 232a-c.

Application image instances for an application 235a-c may be launched in containers 240 dispersed over more than one node 232a-b. In other implementations, application images instances for an application 235a-c may run in one or more containers 240 on the same node 232a-c. Furthermore, an application 235a-c may use more than one application image 240 as part of providing functionality for the application 235a-c. One example of this is a JavaEE™ application that uses a JBoss™ application server-based application image with a supporting MySQL™ database provided by a MySQL™-based application image.

Figure 3:
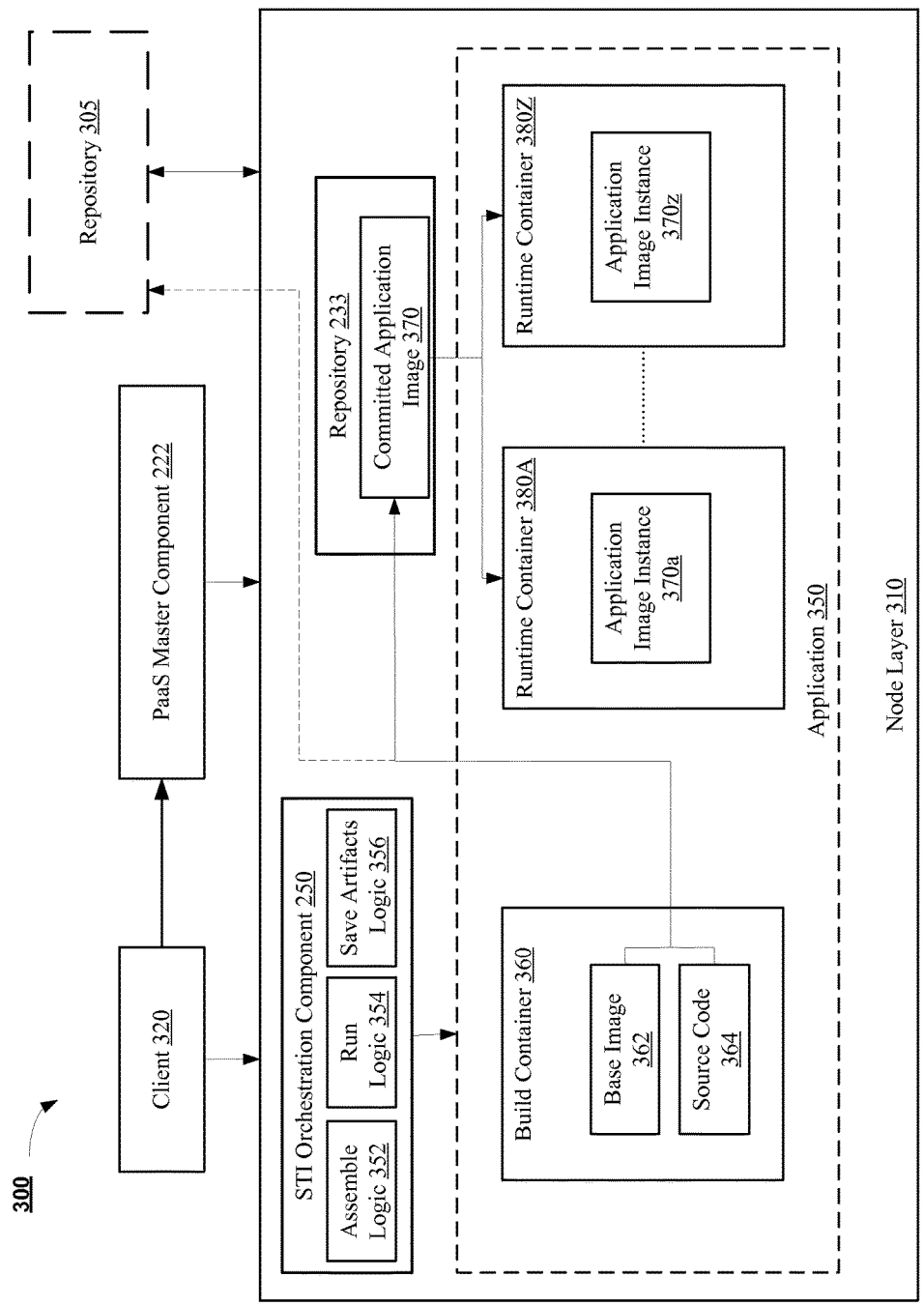
FIG. 3 is a block diagram of a communication architecture of a multi-tenant PaaS providing a source-to-image (STI) framework to produce ready-to-run application images for applications of the multi-tenant PaaS system according to an implementation of the disclosure.

FIG. 3 is a block diagram of a communication architecture 300 of a multi-tenant PaaS providing an STI framework to produce ready-to-run application images for applications of the multi-tenant PaaS system according to an implementation of the disclosure. Architecture 300 includes the PaaS master component 222 in communication with a client 320 and node layer 310. Node layer 310 includes STI orchestration component 250, repository 233, and application 350 (which includes container 360 and 380 distributed across one or more nodes of node layer 310). PaaS master component 222, STI orchestration component 250, and repository 233 may be the same as their counterparts described with respect to FIG. 2.

In one implementation, PaaS master component 222 would receive a request to build an application (either via an API or another trigger event communicated from client 320). The PaaS master component 222 would then invoke STI orchestration component 250 to launch build container 360. The build container 360 may be a resource-constrained process space on the node layer 310 that executes functionality to combine a base image 362 and source code 364 to create an application image. In some implementations, build container 360 is established with resource boundaries, including a limit and/or designation of the amount of memory, amount of storage, and security types and/or labels to be applied to any functions executed by the build container 360.

Build container 360 runs assemble logic 352 using a base image 362 registered for the requested application. In one implementation, the end user identifies the base image 362 when the end user registered the application with the multi-tenant PaaS system. This may allow end users to identify images external to the multi-tenant PaaS for use in the multi-tenant PaaS. The base image 362 may be maintained in a repository of the multi-tenant PaaS, such as repository 233 of node layer 310, or in a remote repository 305 maintained outside of node layer 310. The base image 362 may be associated with core functionality of the application, such as application frameworks including, but not limited to, PHP™, Ruby™, J2EE™, and so on.

The assemble logic 352 run by build container 360 would apply the application source code 364 (e.g., binaries, zipped source, source code, etc.) to the base image 362 to build or assemble a new application image. The application source code 364 may be provided to build container 360 through various delivery methodologies. In one implementation, the application source code 364 may be streamed, for example, as a TAR file to the build container 360. The application source code 364 may be streamed from a client device of an end user, or from another remote location indicated by the user. In another implementation, the application source code 364 may be bind-mounted to the build container 360. In a further implementation, the application source code 364 may be accessed or downloaded using a remote Uniform Resource Locator (URL) provided to build container 360. In some implementations, when the source code 364 is obtained via URL, the source code 364 download is performed prior to the assemble logic 352 building/assembling the new application image and then streamed as part of a tar file provided to the build container 360 or used as part of a bind mount.

When the new application image is built, the assemble logic 352 run by build container 360 causes the application image to be committed to a repository 233, 305. The committed application image 370 may then be used to subsequently launch the application 350. STI orchestration component 250 may provide run logic 354 that defines behaviors to be executed when one or more runtime containers 380A-Z are launched from the committed application image 370. Multiple runtime containers 380A-Z may launch using instances 370a-z of built application image 370 in order to scale up the functionality provided by application image 370 in application 350.

In some implementations, assemble logic 352 and run logic 354 may be provided as part of the application image (e.g., as part of base image 362). In another implementation, the assemble logic 352 and run logic 354 may be external to the application image. The latter scenario allows end users that wish to utilize the base image 362 to be able to modify the assemble logic 352 and run logic 354 to perform differently. In addition, the later scenario allows end users to share the same scripts for the assemble logic 352 and run logic 354 across multiple different images.

In other implementations of the disclosure, the STI orchestration component 250 provides a save artifacts logic 356. The save artifacts logic 356 provides a performance optimization for the STI framework by reusing artifacts from previous builds in subsequent builds. Reusing artifacts also enables consistent rebuilding of application images by ensuring the set of dependencies used during the build is the same each time the build occurs. An artifact refers to one or more byproducts remaining from builds of an image and includes logical collections of deployable code and other files, which form the application. Artifacts are often segregated by type, such as libraries, for example.

The save artifacts logic 356 may include a script that extracts the artifacts out of a previous image by identifying what to extract in order to perform the subsequent runs more efficiently. In some implementations, if a prior build already exists, then the save artifacts logic 356 creates a new container (not shown) from the prior build image, with a volume to save identified artifacts. The save artifacts script from the save artifacts logic 356 is then run in this new container and is responsible for copying the build artifacts (as identified by an end user responsible for the previous build image) into the volume. In other implementations, the identified artifacts are streamed (e.g., as a tar stream) to the STI orchestration component 250 (e.g., to stdout). The STI orchestration component 250 would receive the stream (e.g., from stdout) and extract the artifacts from the stream (e.g., from the tar stream).

The STI orchestration component 250 may then build a new application image using the artifacts saved in the volume from the previous build. In one implementation, the assemble logic 352 is responsible for detecting and using the build artifacts generated and saved from the save artifacts logic 356. As such, the save artifacts logic 356 provides an optimization for STI orchestration component 250 to more quickly and efficiently build application images, as well as allowing subsequent builds to be performed using the same dependent artifacts as earlier builds.

In a further implementation, STI orchestration component 250 supports extended builds for an application image. The extended build allows an application image to be built from a base image 352 that is different than a base image 352 used to actually run the application. The extended build functionality allows the STI orchestration component 250 to provide scripts to build from a first base image while having an output of that build committed using a second base image. The scripts for the extended build logic would transfer results from the built image into a runtime image and commit the runtime image.

In some implementations, STI orchestration component 250 also provide a test script (not shown) that validates whether a resulting application image functions as the end user indicates it should. The test script may utilize a sample application included within the built image 370 to run the image and validate that it works successfully.

Figure 4:
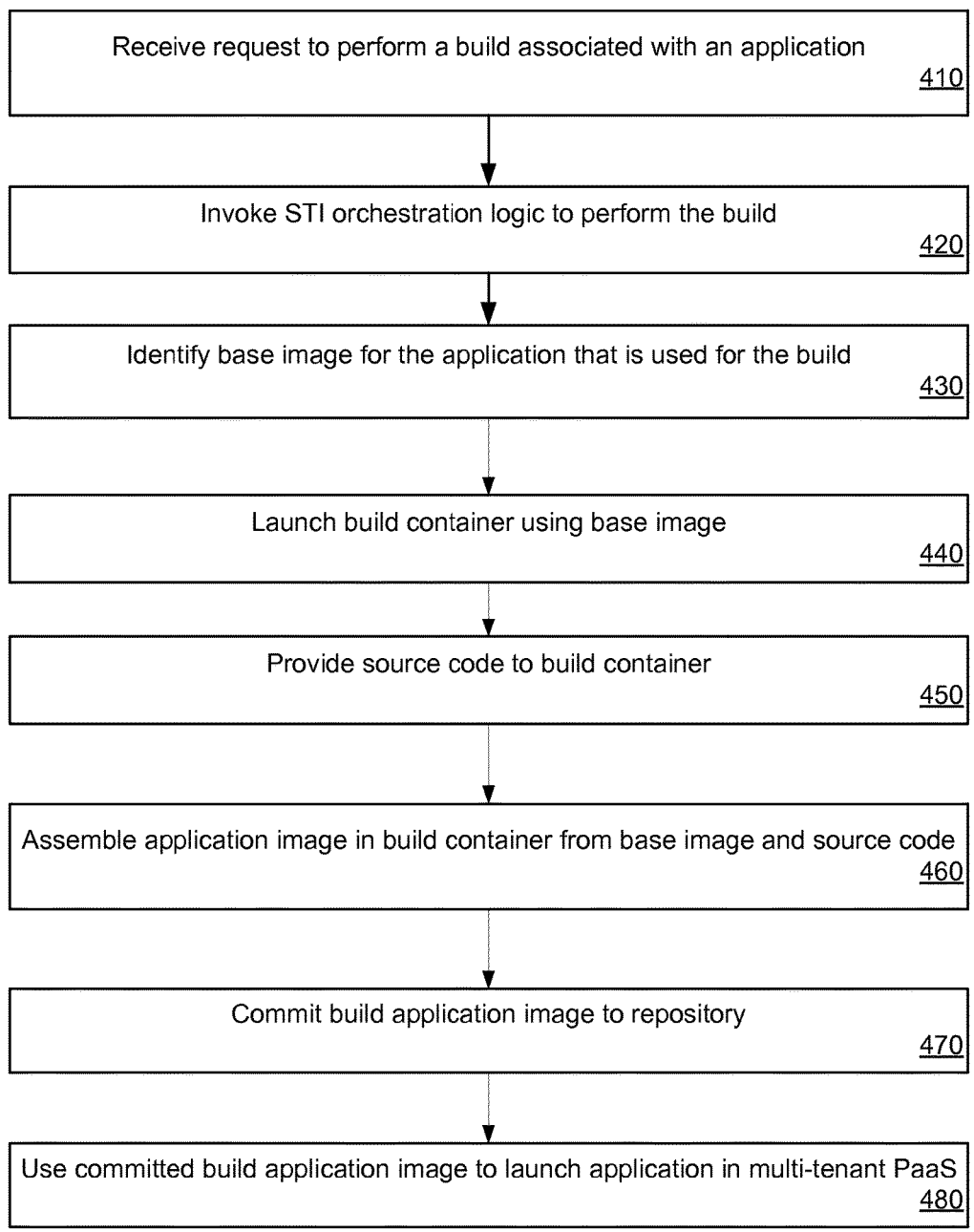
FIG. 4 is a flow diagram illustrating a method for utilizing an STI framework to build an executable image for an application in a PaaS system according to an implementation of the disclosure.

FIG. 4 is a flow diagram illustrating a method 400 for utilizing an STI framework to build an executable image for an application in a PaaS system according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by node layer 232, including any of nodes 232a-c, of FIGS. 2 and 3.

Method 400 begins at block 410 where a request to perform a build for an application of a multi-tenant PaaS is received. In one implementation, the request is sent from an end user at a client device. Then, at block 420, STI orchestration logic is invoked to perform the requested build. In one implementation, the STI orchestration logic is hosted in a container of a node. The node may be the same node that hosts the application or may be another node dedicated to builds using STI orchestration logic. In other implementation, the STI orchestration logic is a binary application executed on a host machine without the use of a container.

At block 430, a base image for the application is identified that is used for the build. In one implementation, the base image is identified by the end user when the end user registers the application with the multi-tenant PaaS. The end user may provide a location of the base image, such as a local or remote repository that maintains the base image. For example, the end user may provide a URL where the base image may be accessed.

Then, at block 440, the STI orchestration logic launches a build container using the base image. Subsequently, at block 450, source code for the application is provided to the build container. In one implementation, the source code is streamed (e.g., as a TAR file) to the build container. For example, the end user may stream the source code from the client device. In other implementations, the source code is bind-mounted to the build container. In another implementation, a remote URL is used to obtain the source code for immediate or subsequent use by the build container.

At block 460, an application image is assembled in the build container from the base image and the source code. Then, at block 470, the build application image is committed to a repository. In one implementation, the repository is on a node of the multi-tenant PaaS. In other implementations, the repository is external to the multi-tenant PaaS. Lastly, at block 480, the committed build application image is used to launch the application in the multi-tenant PaaS.

Figure 5A:
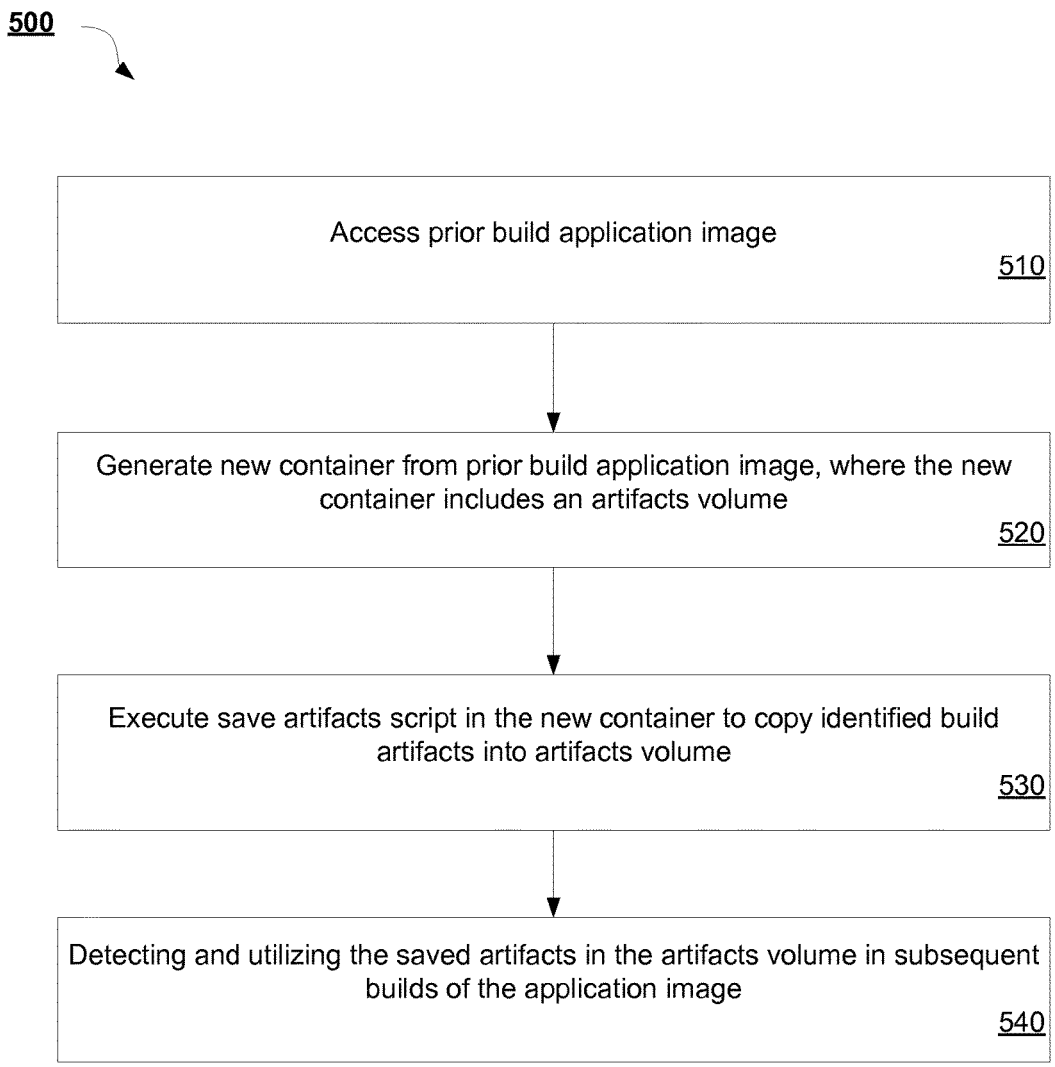

FIGS. 5A and 5B are flow diagrams illustrating methods 500 and 550 for utilizing an STI framework to save artifacts of an executable application image in a PaaS system according to an implementation of the disclosure. Methods 500 and 550 may be performed by processing logic that may comprise hardware (e.g., circuitry, dedicated logic, programmable logic, microcode, etc.), software (such as instructions run on a processing device), firmware, or a combination thereof. In one implementation, methods 500 and 550 are performed by node layer 232, including any of nodes 232a-c, of FIGS. 2 and 3.

Method 500 of FIG. 5A begins at block 510 where a prior build application image is accessed. In one implementation, the prior build application image may be stored in a repository, either internal or remote to the multi-tenant PaaS. Then, at block 520, a new container is generated from the prior build application image. The new container includes an artifacts volume.

Subsequently, at block 530, a save artifacts script from STI orchestration logic is executed in the new container. The save artifacts script copies identified build artifacts from the build application image into the artifacts volume. In one implementation, an end user responsible for the application image previously indicated the artifacts to extract from the application image. Lastly, at block 540, the saved artifacts in the artifacts volume are detected and used to optimize subsequent build of the application image. For example, an assemble script of the STI orchestration logic is responsible for detecting the existence of the saved artifacts in the artifacts volume, and using them as part of the assemble logic for the subsequent application image build.

Method 550 of FIG. 5B begins at block 555 where a prior build application image is accessed. In one implementation, the prior build application image may be stored in a repository, either internal or remote to the multi-tenant PaaS. Then, at block 560, a new container is generated from the prior build application image. The new container includes an archive file.

Subsequently, at block 565, a save artifacts script from STI orchestration logic is executed to copy identified build artifacts from the build application image into the archive file. In one implementation, an end user responsible for the application image previously-indicated the artifacts to extract from the application image. At block 570, the archive file is streamed to stdout.

Lastly, at block 575, the saved artifacts in the archive file streamed to stdout are extracted and used to optimize subsequent build of the application image. For example, an assemble script of the STI orchestration logic is responsible for detecting the existence of the saved artifacts in the artifacts volume, and using them as part of the assemble logic for the subsequent application image build.

Figure 6:
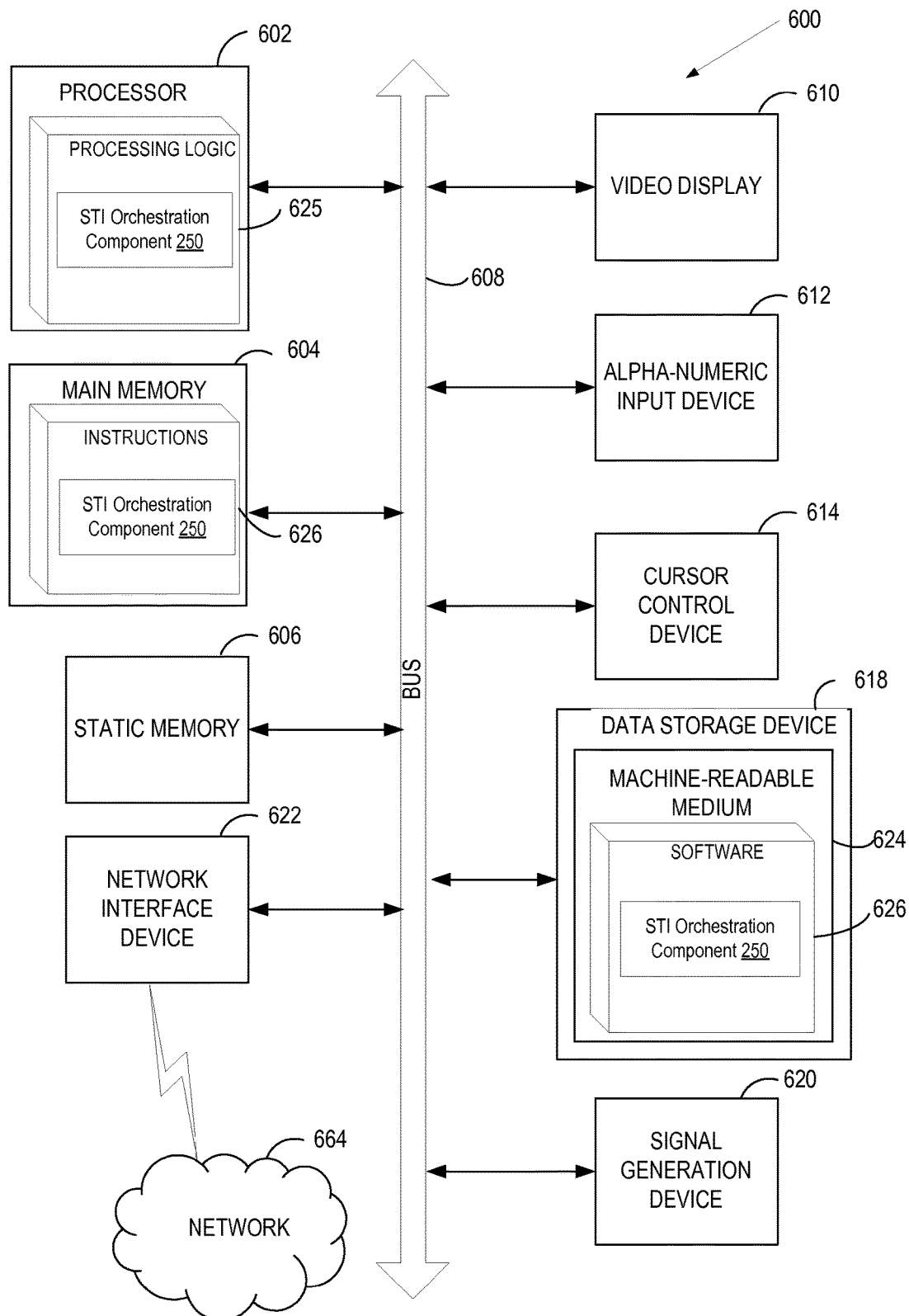
FIG. 6 illustrates a block diagram of one implementation of a computer system.

FIG. 6 illustrates a diagrammatic representation of a machine in the example form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608 communicably coupled to a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 624 on which is stored software 626 embodying any one or more of the methodologies of functions described herein. The software 626 may also reside, completely or at least partially, within the main memory 604 as instructions 626 and/or within the processing device 602 as processing logic 626 during execution thereof by the computer system 600; the main memory 604 and the processing device 602 also constituting machine-accessible storage media.

The machine-readable storage medium 624 may also be used to store instructions 626 to implement STI orchestration component 250 to provide a source to image framework for a PaaS system in a computer system, such as the computer system described with respect to FIG. 1, and/or a software library containing methods that call the above applications. While the machine-accessible storage medium 628 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "invoking", "launching", "accessing", "assembling", "committing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The terms "first", "second", "third", "fourth", etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
    invoking source-to-image (STI) orchestration logic to perform a build of an application image for an application of a multi-tenant Platform-as-a-Service (PaaS) system, wherein the multi-tenant PaaS system comprises a node layer having a plurality of nodes to deploy the application image for the application;
    launching, by a processing device using the STI orchestration logic, a build container for implementing the build using a base image providing a core functionality of the application, wherein the build container comprises a resource-constrained process space that is provided in a node of the plurality of nodes of the PaaS system, the resource-constrained process space to execute an assemble script provided by the STI orchestration logic, wherein the assemble script is separate from the base image;
    accessing, at the build container without user interaction, source code of the application;
    executing, by the processing device at the build container without user interaction, the assemble script to cause the application image to be assembled by applying the source code to the base image;
    committing the application image to a repository; and
    executing, by the processing device using the STI orchestration logic, a run script to cause one or more run-time containers to be launched on the node layer of the multi-tenant PaaS system, the one or more run-time containers separate from the build container on the node layer and used to launch instances of the application image from the repository.

2. The method of claim 1, wherein the base image is corresponded to the application when the application is registered with the multi-tenant PaaS.

3. The method of claim 1, further comprising defining behaviors to be executed when using the committed application image to launch the application in the multi-tenant PaaS.

4. The method of claim 3, wherein the STI orchestration logic comprises run logic to perform the defining the behaviors.

5. The method of claim 1, wherein the repository is internal to the multi-tenant PaaS.

6. The method of claim 1, wherein the repository is external to the multi-tenant PaaS.

7. The method of claim 1, wherein the source code is streamed to the build container.

8. The method of claim 1, wherein the source code is bind-mounted to the build container.

9. The method of claim 1, wherein the source code is accessed via a remote Uniform Resource Locator (URL) by the build container.

10. The method of claim 1, further comprising:
    accessing the application image subsequent to the committing;
    generating a new container from the application image, the new container comprising a save artifacts volume;
    executing a save artifacts script of the STI orchestration logic, the save artifacts script to copy identified build artifacts of the application image into the artifacts volume; and
    utilizing the artifacts in the artifacts volume in subsequent builds of the application image.

11. The method of claim 1, wherein the processing device is part of a node that executes multiple applications comprising at least the application, and wherein the multiple applications are owned by different owners.

12. A system, comprising:
    a memory;
    a processing device communicably coupled to the memory, the processing device to:
        invoke source-to-image (STI) orchestration logic to perform a build of an application image for an application of a multi-tenant Platform-as-a-Service (PaaS) system, wherein the multi-tenant PaaS system comprises a node layer having a plurality of nodes to deploy the application image for the application;
        launch, using the STI orchestration logic, a build container for implementing the build using a base image providing a core functionality of the application, wherein the build container comprises a resource-constrained process space that is provided in a node of the plurality of nodes of the PaaS system, the resource-constrained process space to execute an assemble script provided by the STI orchestration logic, wherein the assemble script is separate from the base image;

access, at the build container without user interaction, source code of the application;

execute, at the build container without user interaction, the assemble script to cause the application image to be assembled by applying the source code to the base image;

commit the application image to a repository; and execute, using the STI orchestration logic, a run script to cause one or more run-time containers to be launched on the node layer of the multi-tenant PaaS system, the one or more run-time containers separate from the build container on the node layer and used to launch instances of the application image from the repository.

13. The system of claim 12, wherein the base image is corresponded to the application when the application is registered with the multi-tenant PaaS.

14. The system of claim 12, wherein the processing device further to use the committed application image to launch the application in the multi-tenant PaaS.

15. The system of claim 12, further comprising:

accessing the application image subsequent to the committing;

generating a new container from the application image, the new container comprising a save artifacts volume;

executing a save artifacts script of the STI orchestration logic, the save artifacts script to copy identified build artifacts of the application image into the artifacts volume; and utilizing the artifacts in the artifacts volume in subsequent builds of the application image.

16. The system of claim 12, wherein the processing device is part of a node that executes multiple applications comprising at least the application, and wherein the multiple applications are owned by different owners.

17. A non-transitory machine-readable storage medium including instructions that, when accessed by a processing device, cause the processing device to:

invoke source-to-image (STI) orchestration logic to perform a build of an application image for an application of a multi-tenant Platform-as-a-Service (PaaS) system, wherein the multi-tenant PaaS system comprises a node layer having a plurality of nodes to deploy the application image for the application;

launch, by the processing device using the STI orchestration logic, a build container for implementing the build using a base image providing a core functionality of the application, wherein the build container comprises a resource-constrained process space that is provided in a node of the plurality of nodes of the PaaS system, the resource-constrained process space to execute an assemble script provided by the STI orchestration logic, wherein the assemble script is separate from the base image;

access, at the build container without user interaction, source code of the application;

execute, by the processing device at the build container without user interaction, the assemble script to cause the application image to be assembled by applying the source code to the base image;

commit the application image to a repository; and execute, by the processing device using the STI orchestration logic, a run script to cause one or more run-time containers to be launched on the node layer of the multi-tenant PaaS system, the one or more run-time containers separate from the build container on the node layer and used to launch instances of the application image from the repository.

18. The non-transitory machine-readable storage medium of claim 17, wherein the processing device is further to use the committed application image to launch the application in the multi-tenant PaaS.

19. The non-transitory machine-readable storage medium of claim 17, wherein the source code is at least one of streamed to the build container, bind-mounted to the build container, or accessed via a remote Uniform Resource Locator (URL) by the build container.

20. The non-transitory machine-readable storage medium of claim 17, wherein the processing device is further to:

access the application image subsequent to the committing;

generate a new container from the application image, the new container comprising a save artifacts volume;

execute a save artifacts script of the STI orchestration logic, the save artifacts script to copy identified build artifacts of the application image into the artifacts volume; and utilize the artifacts in the artifacts volume in subsequent builds of the application image.

* * * * *